United States Patent
Chang et al.

(10) Patent No.: US 11,961,629 B1
(45) Date of Patent: Apr. 16, 2024

(54) ANTIOXIDANT CONDUCTIVE THERMAL PASTE AND METHOD OF MANUFACTURING THE SAME

(71) Applicant: GECKOS TECHNOLOGY CORP., Kaohsiung (TW)

(72) Inventors: Wei-Chen Chang, Kaohsiung (TW); Chen-Yen Fan, Kaohsiung (TW); Ping-Hung Chen, Kaohsiung (TW); Tsung-Huan Sheng, Kaohsiung (TW)

(73) Assignee: Geckos Technology Corp., Kaohsiung (TW)

(*) Notice: Subject to any disclaimer, the term of this patent is extended or adjusted under 35 U.S.C. 154(b) by 0 days.

(21) Appl. No.: 18/063,482

(22) Filed: Dec. 8, 2022

(51) Int. Cl.
*H01B 1/22* (2006.01)
*C09D 5/24* (2006.01)

(52) U.S. Cl.
CPC ............... *H01B 1/22* (2013.01); *C09D 5/24* (2013.01)

(58) Field of Classification Search
CPC ............ H01B 1/00; H01B 1/22; C09D 5/24
See application file for complete search history.

(56) References Cited

U.S. PATENT DOCUMENTS

| | | | | |
|---|---|---|---|---|
| 5,043,102 A * | 8/1991 | Chen | ............... | C08F 292/00 428/416 |
| 5,395,876 A * | 3/1995 | Frentzel | ............... | C08K 3/08 252/514 |
| 2012/0269984 A1 * | 10/2012 | Koshimizu | ............... | C08J 7/0427 252/500 |
| 2017/0236611 A1 * | 8/2017 | Kondo | ............... | H05K 1/028 252/508 |
| 2019/0002617 A1 * | 1/2019 | Kotani | ............... | C09J 7/385 |
| 2021/0139750 A1 * | 5/2021 | Estruga Ortiga | ...... | C09J 175/14 |

FOREIGN PATENT DOCUMENTS

| | | |
|---|---|---|
| CN | 108102578 A | 6/2018 |
| CN | 113004844 A | 6/2021 |
| TW | 201016652 A | 5/2010 |
| TW | I453762 B | 9/2014 |
| TW | I632114 B | 8/2018 |

OTHER PUBLICATIONS

Javed et al. "Optimization of viscosity and composition of mixture of Cu powder and acrylate based resin for vat photopolymerization of metal components", Results in Engineering 19 (2023) 101307.*

* cited by examiner

*Primary Examiner* — Mark Kopec
(74) *Attorney, Agent, or Firm* — Rosenberg, Klein & Lee

(57) ABSTRACT

An antioxidant conductive thermal paste and a method of manufacturing the same are provided. The antioxidant conductive thermal paste includes a reactive monomer, a thermosetting resin, a polymerization inhibitor, an electrically conductive filler, and a thixotropic agent. The method consists of the steps of mixing a reactive monomer, a thermosetting resin, and a polymerization inhibitor evenly to get a first polymer mixture, and adding an electrically conductive filler and a thixotropic agent into the first polymer mixture in turn and blending the mixture evenly to obtain an antioxidant conductive thermal paste with good adherence, high electrical conductivity, high thermal conductivity, improved thermal-mechanical fatigue resistance or mechanical fatigue resistance.

5 Claims, 5 Drawing Sheets

ANTIOXIDANT CONDUCTIVE THERMAL PASTE AND METHOD OF MANUFACTURING THE SAME

BACKGROUND OF THE INVENTION

Field of the Invention

The present invention relates to a conductive thermal paste and a method of manufacturing the same, especially to an antioxidant conductive thermal paste and a method of manufacturing the same which are applied to die bonding.

Description of Related Art

Die attach adhesives which are used to adhere dies to lead frames, substrates, circuit packaging or printed wiring boards should have not only good adherence and mechanical strength but also high thermal conductivity for removal of heat generated by the dies. In the semiconductor industry, fine metal particles of silver, copper, nickel, etc. are dispersed in curable resin components to prepare a conductive paste or thermal paste. After being heated, the conductive paste or thermal paste is cured to form a medium with electrical or thermal conductivity, The conductive paste or thermal paste with fine metal particles can have many applications such as formation of conductive circuit on printed circuit boards, production of electronics or electrode of solar cells, formation of conductive film used as electromagnetic shielding case, or adhesives for adhering chip components such as capacitors, resistors, LEDs, memories, processing elements or attaching them to substrates.

Refer to Chinese Pat. Pub. No. 113004844A, a high heat dissipation conductive adhesive which includes epoxy, silver flakes, and new-type silver powder is revealed. In the conductive adhesive, conductive particles used are silver particles whose diameter is ranging from 2 to 20 μm. Such particle size leads to lower space utilization of the metal particles in the conductive adhesive, poor electrical conductivity and poor heat dissipation.

Also refer to Chinese Pat. Pub. No. 108102578A, a method of preparing conductive adhesives is revealed. The conductive adhesive consists of epoxy, silver powder, a curing agent, a leveling agent, etc. The amount of metal particles in the conductive adhesive is controlled between 75-80% yet a lower ratio of the metal particles will affect electrical conductivity of the conductive adhesive.

The metals used in the conductive paste or thermal paste with fine metal particles can be silver powder revealed in Taiwanese Pat. No. I632114(B), copper piece coated with silver disclosed in Taiwanese Pat. No. I453762(B), or tin-based solder powder revealed in Taiwanese Pat. Pub, No. 201016652(A). However, the cost of silver is high while tin is unstable and harmful to the environment. As to the conductive paste or the thermal paste made from the copper coated with silver, it has defect of non-uniform coating. Thus there is room for improvement and there is a need to provide a conductive paste or thermal paste with higher stability and lower cost.

Thus there is room for improvement and there is a need to provide a novel antioxidant conductive thermal paste and a method of manufacturing the same.

SUMMARY OF THE INVENTION

Therefore, it is a primary object of the present invention to provide an antioxidant conductive thermal paste and a method of manufacturing the same which overcome the shortcomings mentioned above.

In order to achieve the above object, an antioxidant conductive thermal paste according to the present invention include a reactive monomer, a thermosetting resin, a polymerization inhibitor, an electrically conductive filler, and a thixotropic agent.

In order to achieve the above object, a method of manufacturing an antioxidant conductive thermal paste according to the present invention includes the following steps. First mix a reactive monomer, a thermosetting resin, and a polymerization inhibitor evenly to get a first polymer mixture. Then add an electrically conductive filler into the first polymer mixture and blend evenly to get a second polymer mixture. Next add a thixotropic agent into the second polymer mixture, mix evenly, and perform vacuum defoaming to obtain an antioxidant conductive thermal paste.

Preferably, the reactive monomer can be ethoxylated trimethylolpropane triacrylate, trimethylolpropane ethoxylate triacrylate, hexamethylene diacrylate, isobornyl acrylate, tripropylene glycol diacrylate, or their combinations.

Preferably, the thermosetting resin can be polyurethane acrylate (PUA), acrylic ester (acrylate), or their combinations. The polymerization inhibitor can be 4-tert-butylcatechol, N-tallow-1,3-diaminopropane dioleate (Duomeen TDO) or combinations thereof.

Preferably, the electrically conductive filler is conductive copper powder.

Preferably, a median particle diameter D50 of the conductive copper powder is ranging from 0.1 to 10 μm and a ratio of D90 to D50 of the particle diameter of the conductive copper powder is smaller than 3.

Preferably, the antioxidant conductive thermal paste according to the present invention contains 3-17 wt % reactive monomer, 5-15 wt % thermosetting resin, 0.5-4 wt % polymerization inhibitor, 0.1-3 wt % thixotropic agent, and 75-90 wt % electrically conductive filler.

The antioxidant conductive thermal paste according to the present invention is cured (hardened) between 150 and 250° C. and the curing time is about 20-120 minutes. After curing, the cured antioxidant conductive thermal paste has good adherence, high electrical conductivity, high thermal conductivity, and improved thermal-mechanical fatigue resistance or mechanical fatigue resistance. The cured antioxidant conductive thermal paste also allows components connected with two sides thereof to have electrically conductive interconnection. A long term stable contacts with low contact resistance and high thermal conductivity are provided within the interconnection. Moreover, the conductive copper powder is used as catalyst and initiator so that there is no need to add the initiator in order to achieve the same effect.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
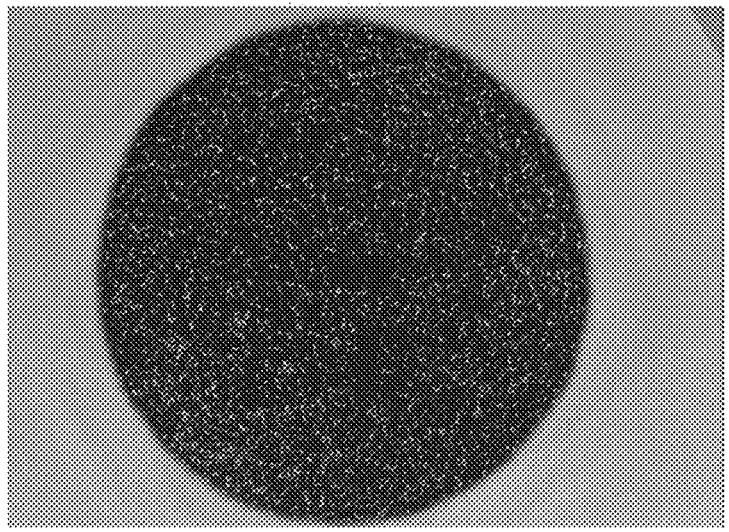
FIG. 1 shows scanning electron microscope (SEM) images of an embodiment according to the present invention.
Figure 1:
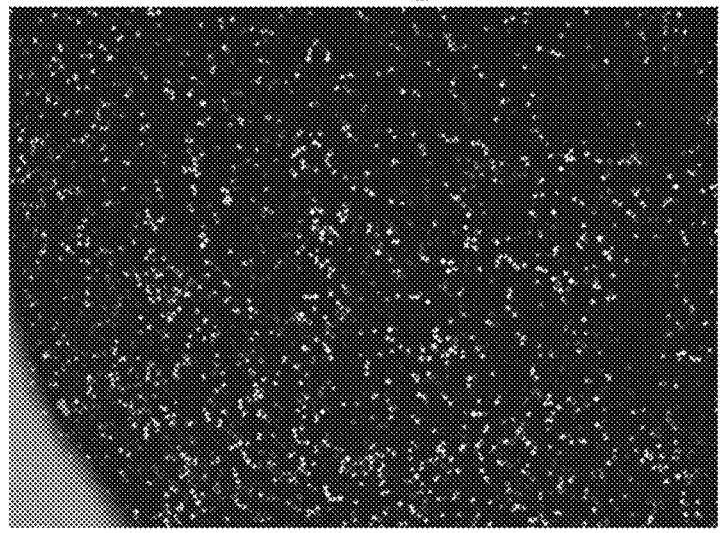

In order to learn technical content, purposes and functions of the present invention more clearly and completely, please refer to the following detailed descriptions with the figures and reference signs. The followings are preferred embodiments of the present invention, only intended to illustrate the invention and not to limit the scope of the invention.

An antioxidant conductive thermal paste and a method of manufacturing the same according to the present invention are provided. The antioxidant conductive thermal paste of the present invention mainly includes a reactive monomer, a thermosetting resin, a polymerization inhibitor, an electrically conductive filler, and a thixotropic agent.

A method of manufacturing an antioxidant conductive thermal paste includes the following steps.

Step 1: mixing a reactive monomer, a thermosetting resin, and a polymerization inhibitor and blending evenly by a vacuum mixer at a high speed to get a first polymer mixture;

Step 2: adding an electrically conductive filler into the first polymer mixture and mixing them evenly using the vacuum mixer at a high speed to obtain a second polymer mixture; and Step 3: adding a thixotropic agent into the second polymer mixture and using the vacuum mixer to perform stirring, vacuum defoaming and even mixing to obtain an antioxidant conductive thermal paste.

The reactive monomer can be ethoxylated trimethylolpropane triacrylate, trimethylolpropane ethoxylate triacrylate, hexamethylene diacrylate, isobornyl acrylate, tripropylene glycol diacrylate, or their combinations. A weight percent of the reactive monomer is preferably 3-17 wt % of the antioxidant conductive thermal paste. As a reactive diluent, the reactive monomer is reacted with thermosetting resin by intramolecular epoxy groups to become a part of cured substance. Thus the antioxidant conductive thermal paste of the present invention doesn't have the shortcoming of evaporation of diluents (dry out). Moreover, glass transition temperature (Tg) or toughness of the products after curing can be reduced while using such kind of the reactive monomer, The thermosetting resin used can be natural or synthetic, a monomer produced by modified or unmodified resin, or oligomer or prepolymer. The resin mentioned above is not completely cured and/or crosslinked yet so that it can be further cured and/or crosslinked by polymerization, polycondensation, and/or polyaddition. At room temperature or a lower temperature (such as less than 100° C.), the thermosetting resin is in a liquid form. The above "cured" and "crosslinked" mean reaction of the thermosetting resin with the reactive monomer to have crosslinking or curing structure. The thermosetting resin can be polyurethane acrylate (PUA), acrylic ester (acrylate), or their combinations. A weight percentage of the thermosetting resin in the antioxidant conductive thermal paste is preferably 5-15 wt %.

The polymerization inhibitor used can be 4-tert-butylcatechol, N-tallow-1,3-diaminopropane dioleate (Duomeen TDO), or their combinations and its weight percentage in the antioxidant conductive thermal paste is preferably 0.5-4 wt %.

The thixotropic agent used can be polyamide wax, oxidized polyethylene wax, or combinations thereof. The preferred weight percentage of the thixotropic agent in the antioxidant conductive thermal paste is 0.1-3 wt %.

The electrically conductive filler used in the antioxidant conductive thermal paste is conductive copper powder. A lower limit of the weight percentage of the conductive copper powder is preferably more than 65 wt %, more preferably 70 wt %, particularly preferably 76 wt %, and the most preferably 82 wt % while an upper limit of the weight percentage of the conductive copper powder is preferably 90 wt %, more preferably 87 wt %, and particularly preferably 84 wt %. Thereby a die attach adhesive layer formed after curing of the antioxidant conductive thermal paste has a better electrical conductivity. Moreover, the higher weight percentage of the electrically conductive filler, the better heat dissipation of the antioxidant conductive thermal paste. The viscosity of the antioxidant conductive thermal paste can be adjusted by the weight percentage of the electrically conductive filler so as to have better operation while dispensing or spraying the adhesives.

A median particle diameter D50 (the corresponding particle size when the cumulative percentage reaches 50%) of the conductive copper powder is preferably 0.5-10 μm, more preferably 1.0-7.0 μm, and particularly preferably 2.0 μm-4.0 μm. D50 means among the electrically conductive filler, the particle size of 50 vol % particles is 0.5-10 μm, preferably 1.0-7.0 μm, and more preferably 2.0 μm-4.0 μm. When the cumulative percentage of volume-based particle size distribution reaches 90%, a median particle diameter D90 of the conductive copper powder is preferably 1.8-9 μm, more preferably 3.0-9 μm, and particularly preferably 3-5.5 μm. D90 means that 90% of the total particles are smaller than this size. Also refer to a scanning electron microscope (SEM) image shown in FIG. 1, the conductive copper powder therein is white or gray particles evenly distributed, without aggregating into clusters.

The conductive copper powder with smaller particle diameter can not only reduce gap between the electrically conductive filler after curing but also make the antioxidant conductive thermal paste have high storage stability, without precipitation of the electrically conductive filler during storage. Moreover, the electrically conductive filler aggregates more densely after being mixed with the thermosetting resin when its particle diameter distribution is obvious. Thus the electrically conductive filler has wider contact surface and both electrical conductivity and thermal conductivity of the die attach adhesive are further improved.

Figure 2:
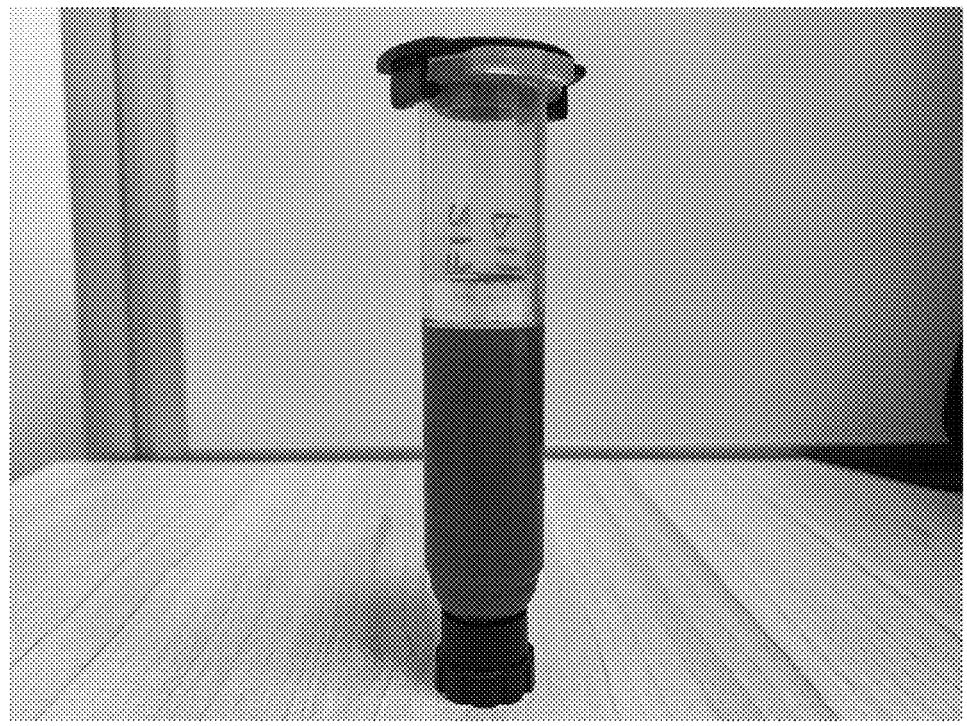
FIG. 2 is an image showing an embodiment standing for a few days according to the present invention.

While preparing the antioxidant conductive thermal paste, a width of the distribution pattern of the particle diameter of the electrically conductive filler is preferred to be narrower. For example, the antioxidant conductive thermal paste prepared has better performance when a ratio of D90 to D50 (D90/D50) is less than 3.0 while the D90/D50 smaller than 2.3 is more preferred and the D90/D50 smaller than 1.7 is particularly preferred. The dispersion of the electrically conductive filler in the antioxidant conductive thermal paste can be improved by adjustment of the value of D90/D50 of the electrically conductive filler. Thus reliability of the antioxidant conductive thermal paste is further increased. The ratio of the D90 to the D50 of the electrically conductive filler is quite low so that physical stability of the antioxidant conductive thermal paste during storage is quite high, without any precipitation occurred. As shown in FIG. 2, the antioxidant conductive thermal paste is standing for over 30 days and observed. There is no precipitate formed. Thereby one of the advantages of the antioxidant conductive thermal paste is that it is not easily precipitated.

Figure 3:
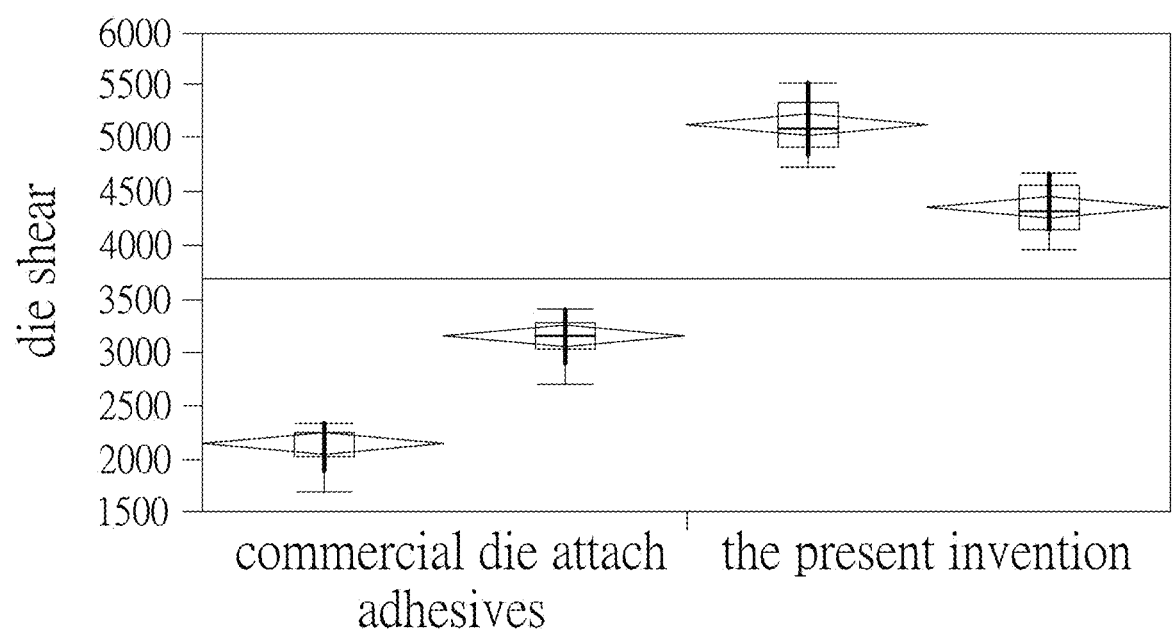
FIG. 3 shows die shear of commercial die attach adhesives and an embodiment according to the present invention.

Moreover, an interface of the antioxidant conductive thermal paste according to the present invention has a lower shrinkage rate after curing. An increase in interface stress is inhibited and an interface strength of the die attach adhesive is increased. Thereby die shear is increased. As shown in FIG. 3, compared with the die attach adhesives available on the market now, the present antioxidant conductive thermal paste has the die shear 150-200% higher than the die shear of the commercial die attach adhesives.

The antioxidant conductive thermal paste according to the present invention contains 3-17 wt % reactive monomer, 5-15 wt % thermosetting resin, 0.5-4 wt % polymerization inhibitor, 75-90 wt % conductive copper powder, and 0.1-3 wt % thixotropic agent.

The present antioxidant conductive thermal paste prepared can be applied to die adhesion. A cured die attach adhesive layer is formed between the semiconductor component and the substrate to load the semiconductor component on the substrate. Compared with the conventional die attach adhesives, the die attach adhesive layer formed by the cured antioxidant conductive thermal paste is more reliable with lower cost.

Figure 4A:
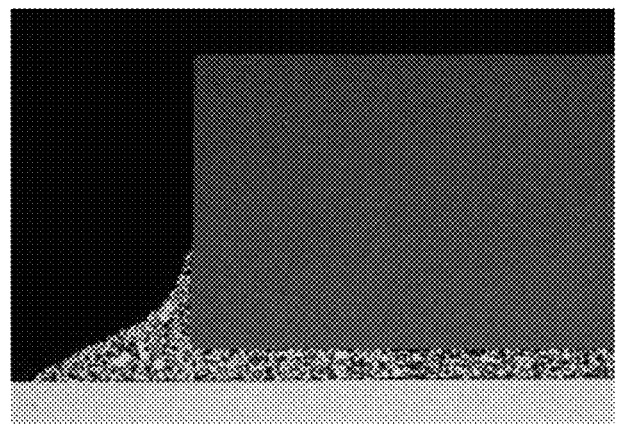
FIG. 4A is a scanning electron microscope image showing a sectional view of a semiconductor component packaged by an embodiment after curing according to the present invention.
Figure 4B:
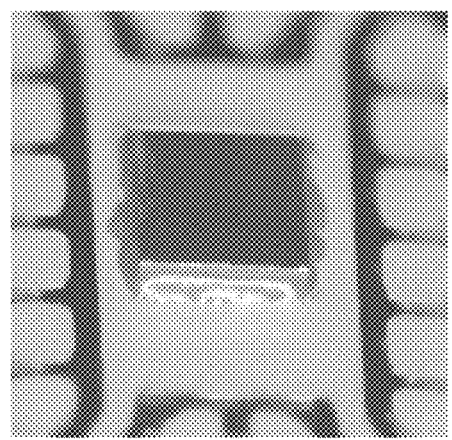
FIG. 4B is a scanning electron microscope image showing a top view of a semiconductor component packaged by an embodiment and a fillet height of a die according to the present invention.

The antioxidant conductive thermal paste used as the die attach adhesive is applied to the substrate by dispensing or spraying. Then the semiconductor component is loaded on the die attach adhesive for fixing. The antioxidant conductive thermal paste can be covered on side surfaces of the semiconductor component while in use. Thereby the semiconductor component is fixed and covered by the present thermal paste. While being used to perform semiconductor package, fillet height can be controlled to be 50-80%, or even 30-50% of the thickness of the semiconductor to avoid short circuit event, without affecting the performance of the semiconductor component. Once the die attach fillet height is too high, short circuit occurs. FIG. 4A is a scanning electron microscope image showing a sectional view of a semiconductor component packaged by the present antioxidant conductive thermal paste while FIG. 4B is also a SEM image showing a top view of a semiconductor component packaged by the present antioxidant conductive thermal paste and the fillet height of the chip is observed. According to the results shown in FIG. 4A and FIG. 4B, there is no high fillet height.

The antioxidant conductive thermal paste prepared by the present invention has a density of 3.0-4.7 g/c.c. Thus uneven distribution of the electrically conductive filler in the die adhesion layer formed by the cured antioxidant conductive thermal paste can be inhibited.

Run the Brookfield cone & plate viscometer with spindle CP-51 at 0.5 rpm and 5 rpm to measure viscosity of the present antioxidant conductive thermal paste. While tested at 5.0 rpm and 25° C., the viscosity measured is 6,000-50,000 CP, TI (0.5/5)=1.3-6, with suitable rheological range, viscosity, and physical stability during storage.

A volume resistivity of the antioxidant conductive thermal paste prepared by the present invention is between $10^{-5}$ Ohm-cm-$10^{-3}$ Ohm-cm. Apply the antioxidant conductive thermal paste with 4×4 cm$^2$ and thickness of 5-100 μm to a slide by screen printing. Then the thermal paste is cured in a nitrogen oven. During the curing, the temperature of the film formed is increased from 25° C. to 130° C. in 40 minutes and maintained at 130° C. for 30 minutes. Then the temperature is increased from 130° C. to 220° C. in 30 minutes and maintained at 220° C. for 60 minutes. After curing, a four-point probe is used to measure the resistance and the volume resistivity is calculated by equations.

An antioxidant conductive thermal paste according to the present invention can be used to attach dies with maximum area of 5×5 mm$^2$ to the substrate. The die backside can be a layer of silicon or metal coating such as gold coating, silver coating, copper coating or aluminum coating. Then different curing processes are performing to cure the antioxidant conductive thermal paste and no gap is left between the dies and the substrate adhered to each other. In order to meet user's needs, the following two curing processes are used, but not limited. In the first curing process, it takes 40 minutes to increase the temperature from room temperature to 130° C. and then the temperature is maintained at 130° C. for 30 minutes. Then the temperature is increased from 130° C. to 220° C. in 30 minutes and maintained at 220° C. for 60 minutes. As to the second curing process, the temperature is increased from room temperature to 120° C. in 20 minutes and maintained at 120° C. for 10 minutes. Then it takes 20 minutes to increase the temperature from 120° C. to 200° C. and the temperature is maintained at 200° C. for 60 minutes. The third one is taking 40 minutes to increase the temperature from room temperature to 180° C. and maintain at 180° C. for 90 minutes. During the first and the second curing processes, no additional pressure is applied and the present antioxidant conductive thermal paste is cured successively. While using the present thermal paste to attach the dies with the backside of silicon or a layer of metal coating to a pre-plating frame with general or roughened surfaces, the antioxidant conductive thermal paste is cured by the above curing process to form a cured (hardened) layer with thermal conductivity of 3-20 W/mk and a lower limit of its die shear strength at room temperature is larger than 2200 g/(1 mm$^2$).

After packaging, the packaged dies with the present antioxidant conductive thermal paste are placed under conditions of 85° C., 85% relative humidity (RH), soaking 168 hours. A temperature cycling test is performed between temperatures −65° C. and 150° C. for 4000 cycles. Then use scanning acoustic tomography to detect whether delamination occurs among the cured layer formed by the antioxidant conductive thermal paste, the frame, and the dies. There is no delamination and this means the cured layer formed by the antioxidant conductive thermal paste is having a certain internal stress and able to inhibit warpage caused by moisture absorbed or temperature changes.

The applications of the antioxidant conductive thermal paste according to the present invention include, but not limited to, Quad Flat Non-leaded Package (QFN), Quad Flat Package (QFP), Small Outline Package (SOP), Chip Size Package (CSP), Small Outline Non-leaded Package (SON), Ball Grid Array (BGA), Lead Flame BGA (LF-BGA), Flip Chip BGA (FCBGA), Molded Array Process BGA (MAPBGA), etc.

The antioxidant conductive thermal paste according to the present invention has unique adhesive properties due to its unique formula. While being applied to the frame with roughened surfaces on an operation machine by high-speed needle dispensing/spraying, good recognition is obtained in Automated Optical Inspection. Thus more precise die bonding and alignment is achieved. The die attach adhesives available now have problems of poor recognition and imprecise die alignment. Moreover, the antioxidant conductive thermal paste will not dry up, even over 140 hours under high-speed needle dispensing/spraying. In contrast, the die attach adhesives available now dry easily during the high-speed needle dispensing/spraying. Thus the present antioxidant conductive thermal paste makes the manufacturing processes more optimized.

The followings are embodiments of the present invention used for illustration of applications of the present invention, not intended to limit the scope of the present invention.

In the following embodiments, an antioxidant conductive thermal paste according to the present invention include 6-10 wt % reactive monomer, 8-13 wt % acrylic ester (acrylate), 0.8-1.5 wt % 4-tert-Butylcatechol, 0.6-1.6 wt % polyamide wax, and 73.8-84.5 wt % conductive copper powder. The reactive monomer includes at least one of the followings, tripropylene glycol diacrylate and trimethylolpropane ethoxylate triacrylate. The conductive copper powder is spherical powder with a median particle diameter D50 ranging from 0.1 to 10 μm.

Figure 5A:
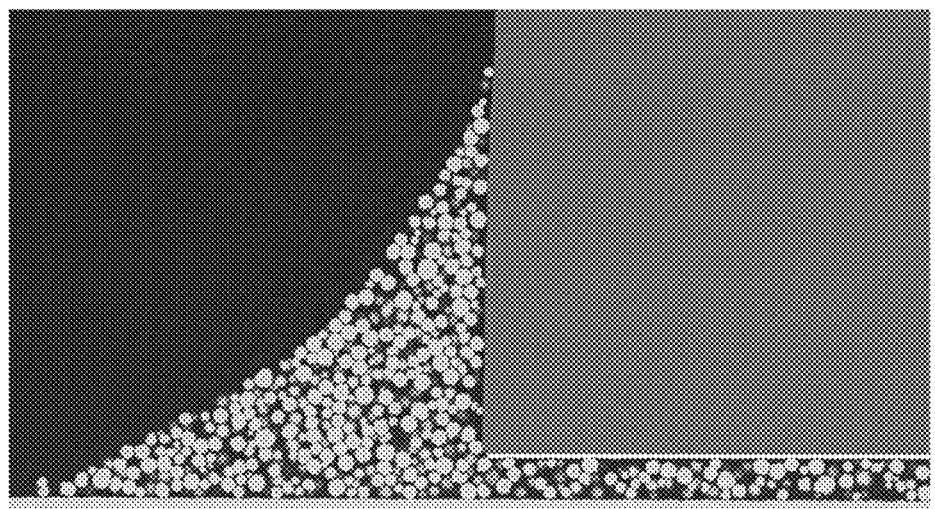
FIG. 5A and FIG. 5B are scanning electron microscope images showing pattern of an embodiment in a semiconductor component packaged by the embodiment according to the present invention.
Figure 5B:
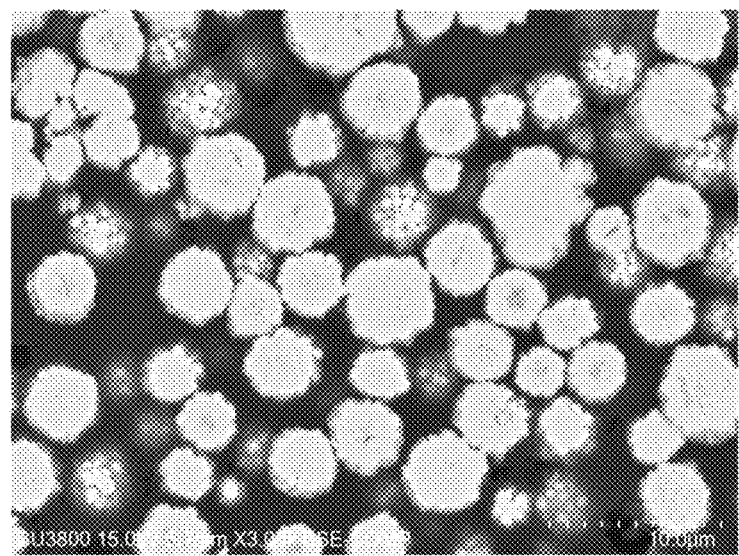

Furthermore, use scanning electron microscopes (SEM) to observe patterns of the conductive copper powder in the antioxidant conductive thermal paste of this embodiment. Please refer to FIG. 5A and FIG. 5B, the conductive copper powder in the antioxidant conductive thermal paste looks like spherical particles and such structure makes the conductive copper powder aggregate more closely during curing (hardening) of the present antioxidant conductive thermal paste. Thus the Die attach adhesive will not clog the needle used for applying during the dispensing or spraying. Therefore, the dispensing or spraying operation is smoother.

Then the antioxidant conductive thermal paste prepared is applied to die bonding and perform certain tests.

Embodiment 1

Use a die bonder (ASM AD838) set with 0.2-0.4 mm nozzle size, 20-60 ms squeeze time, 90-110 KPa squeeze pressure, and −8--11 KPa squeeze vacuum to dispense the above antioxidant conductive thermal paste prepared on a 3.5 mm×2.5 mm×0.65 mm (Length×Width×Thickness) pre-plating copper frame with general or roughened surfaces. Then arrange a silicon chip with the length of 0.955 mm, the width of 0.875 mm, and the thickness of 0.2 mm at the above antioxidant conductive thermal paste to get a die attach layer with a thickness 5 μm-30 μm. Next the die attach layer is cured by the following curing process. During the curing process, the temperature is increased from 25° C. to 130° C. in 40 minutes and maintained at 130° C. for 10 minutes. Then the temperature is increased from 130° C. to 200° C. in 30 minutes and maintained at 200° C. for an hour. Thus a cured layer is obtained and epoxy molding compounds for sealing semiconductors are used for packaging. In this embodiment, the package size is 3.5 mm×2.5 mm×0.85 mm (L×W×Thickness). At last, carry out post mode curing to get a Quad Flat Non-leaded Package (QFN). The test results show that the antioxidant conductive thermal paste of the present invention passes the moisture sensitivity level 1 (MSL1), MSL2, and MSL3 tests.

The package of the roughened pre-plating copper frame and the silicon chip attached by the antioxidant conductive thermal paste of the present invention has a die shear strength with a lower limit of 2200 g/(1 mm×1 mm) at 25° C. This means the present antioxidant conductive thermal paste provides a certain adhesive force for supporting external forces caused during the following processing steps.

In this embodiment, produce 500 semiconductor packages according to the method mentioned above and carry out the following test. First of all, place these semiconductor packages at 85° C. and 85% relative humidity for 168 hours. Then perform the temperature cycling test with the temperatures between −65° C. and 150° C. for 4000 cycles. Lastly use ultrasonic scanning acoustic tomography to detect the semiconductor packages.

The detection results show that no delamination occurs among the cured layer formed by the antioxidant conductive thermal paste, the roughened copper frame, and the silicon chip in the semiconductor devices treated under the above conditions. The results indicate that the antioxidant conductive thermal paste is having a certain internal stress and able to inhibit warpage caused by moisture absorbed or temperature changes.

Embodiment 2

Attach the above antioxidant conductive thermal paste prepared to a roughened copper frame with the length of 8.5 mm, the width of 3.4 mm, and the thickness of 0.15 mm. Then dispose a silicon chip with the length of 4.275 mm, the width of 2.525 mm, the thickness of 0.2 mm, and a gold-coated backside on the antioxidant conductive thermal paste to obtain a die attach layer with a thickness 10 μm-35 μm. Next carry out a curing process in which first the temperature of the die attach layer is increased from room temperature to 120° C. in 20 minutes and maintained at 120° C. for 10 minutes. Then the temperature is increased from 120° C. to 200° C. in 20 minutes and maintained at 200° C. for 60 minutes to obtain a cured layer. Then epoxy molding compounds for sealing semiconductors are used for packaging and the package size is 3.5 mm×2.5 mm×0.85 mm (L×W×T). Lastly perform post mode curing to get a Small Outline Package (SOP). The test results show that the antioxidant conductive thermal paste of the present invention passes the MSL1, MSL2, and MSL3 tests.

The package of the roughened pre-plating copper frame and the silicon chip prepared using the antioxidant conductive thermal paste of the present invention has a die shear strength with a lower limit of 2500 g/(1 mm×1 mm) at 25° C. This means the present antioxidant conductive thermal paste provides a certain adhesive force for supporting external forces caused during the following processing steps.

Prepare 500 semiconductor packages by the above method and carry out the following test. In the beginning, place these semiconductor packages at 85° C. and 85% relative humidity for 168 hours. Then perform the temperature cycling test with the temperatures between −65° C. and 150° C. for 4000 cycles. Lastly use ultrasonic scanning acoustic tomography to detect the semiconductor packages.

The detection results show that no delamination occurs among the cured layer formed by the antioxidant conductive thermal paste, the roughened copper frame, and the silicon chip in the semiconductor devices treated under the above conditions. The results indicate that the antioxidant conductive thermal paste is having a certain internal stress and able to inhibit warpage caused by moisture absorbed or temperature changes.

Embodiment 3

Use a die bonder (ASM AD838) set with 0.2-0.3 mm nozzle size, 20-60 ms squeeze time, 120-160 KPa squeeze pressure, and −4--6 KPa squeeze vacuum to dispense the antioxidant conductive thermal paste prepared on a 9.9 mm×3.9 mm×1 mm (L×W×T) pre-plating copper frame with general or roughened surfaces. Then load a silicon chip with the length of 1.935 mm, the width of 1.01 mm, and the thickness of 0.2 mm on the antioxidant conductive thermal paste to get a die attach layer with a thickness 5 μm-30 μm. Next carry out a curing process. During the curing process, the temperature is increased from room temperature to 180° C. in 40 minutes and maintained at 180° C. for 90 minutes. Thus a cured layer is obtained and epoxy molding compounds for sealing semiconductors are used for packaging while the package size is 9.9 mm×3.9 mm×1.65 mm (L×W×T). At last, carry out post mode curing to get a Small Outline Non-leaded Package (SON). The test results show that the antioxidant conductive thermal paste of the present invention passes the MSL1, MSL2, and MSL3 tests.

The antioxidant conductive thermal paste, the pre-plating copper frame and the silicon chip mentioned above have a die shear strength with a lower limit of 2300 g/(1 mm×1 mm) at 25° C. This means the present antioxidant conductive thermal paste provides a certain adhesive force for supporting external forces caused during the following processing steps. Produce 100 semiconductor packages of the third embodiment by the above method and perform the following test. First place these semiconductor packages at 85° C. and 85% relative humidity for 168 hours. Then perform the temperature cycling test with the temperatures between −65° C. and 150° C. for 4000 cycles. Lastly use ultrasonic scanning acoustic tomography to detect the semiconductor packages. The detection results show that no delamination occurs among the cured layer formed by the antioxidant conductive thermal paste, the pre-plating copper frame, and the silicon chip in the semiconductor devices treated under the above conditions. The results indicate that the antioxidant conductive thermal paste is having a certain internal stress and able to inhibit warpage caused by moisture absorbed or temperature changes.

The above antioxidant conductive thermal paste of the present invention prepared is analyzed by dynamic mechanical analyzer (DMA), thermomechanical analyzer (TMA), thermogravimetric analyzer (TGA), and differential scanning calorimeters (DSC). Before analysis, pour the antioxidant conductive thermal paste on a teflon tool and heat in a vacuum oven overnight. The next day put the teflon tool with the paste into a high vacuum furnace for curing. After cooling down, a thin film is obtained and taken to be analyzed.

1. Dynamic Mechanical Analyzer (DMA)

Use TA instruments Q800 Dynamic mechanical analyzer (DMA) to perform analysis. The above thin film obtained is mounted in a clamp in a furnace assembly and then nitrogen gas is introduced. Then the temperature is set to increase from −50° C. to 350° C. at a rate of 5° C. per minute. Record and observe strength, viscosity, elasticity, and phase transition properties of the thin film while being applied with different temperatures, forces, and frequencies. The measured tan delta (Tan δ), the ratio of the loss to the storage, is 45-70° C. while the Storage Modulus (E') are respectively 5500-9500 MPa and 400-1200 MPa at 25° C. and 200° C.

2. Thermomechanical Analyzer (TMA)

Use TA instruments Q400 thermomechanical analyzer (TMA) to determine changes in shape of samples. The above thin film is clamped in a fixture with thermal expansion. Then place the fixture into a furnace and introduce nitrogen gas (−120 mL/min) into the furnace. The temperature is set to increase from −50° C. to 250° C. at a rate of 10° C. per minute and record shape changes of the sample along with the temperature changes. The measured values of the thin film are glass transition temperature (Tg) 53-60° C., coefficient of thermal expansion (CTE), Alpha 1, 35-60 ppm/° C.; Alpha 2, 120-150 ppm/° C.

3. Thermogravimetric Analyzer (TGA)

Use TA instruments Q50 thermogravimetric analyzer (TGA) for analysis. Place the above thin film on a platinum plate, put into a furnace, and introduce a mixture of nitrogen/air mixed in a fixed ratio. The temperature is set to increase from 30° C. to 350° C. at a rate of 10° C. per minute and record changes in the sample weight along with the temperature and the time to get thermal stability of the thin film. The result shows that the antioxidant conductive thermal paste of the present invention has good thermal stability, with only 5-6% weight loss at the increasing temperature up to 350° C.

4. Moisture Sensitivity Level (MSL) Test

The tests are carried out according to JEDEC J-STD-020E standard for classification of moisture sensitivity levels. In moisture sensitivity level 1 (MSL 1) test, the sample is exposed to the condition of 85° C. and 85% relative humidity (RH) for 168 hours. As to the MSL 2 and MSL 3 tests, the test conditions are respectively 85° C./60% RH for 168 hours and 30° C./60% RH for 192 hours. The test results show that the antioxidant conductive thermal paste of the present invention passes the MSL1, MSL2, and MSL3 tests.

In addition, the electrically conductive filler in the antioxidant conductive thermal paste, especially the conductive copper powder, is able to use as catalyst and initiator at the same time so that there is no need to add the initiator in the antioxidant conductive thermal paste.

In summary, the present antioxidant conductive thermal paste provides good adherence, high electrical conductivity, high thermal conductivity, and improved thermal-mechanical fatigue resistance or mechanical fatigue resistance. The cured antioxidant conductive thermal paste also allows components connected with two sides thereof to have electrically conductive interconnection. A long term stable contacts with low contact resistance and high thermal conductivity are provided within the interconnection.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. An antioxidant conductive thermal paste comprising: a reactive monomer, a thermosetting resin, a polymerization inhibitor, an electrically conductive filler, and a thixotropic agent; wherein the reactive monomer is selected from the group consisting of ethoxylated trimethylolpropane triacrylate, trimethylolpropane ethoxylate triacrylate, hexamethylene diacrylate, isobornyl acrylate, tripropylene glycol diacrylate, and combinations thereof; wherein the thermosetting resin is selected from the group consisting of polyurethane acrylate (PUA), acrylic ester (acrylate), and combinations thereof; wherein the polymerization inhibitor is selected from the group consisting of 4-tert-butylcatechol, N-tallow-1,3-diaminopropane dioleate, and combinations thereof; wherein the electrically conductive filler is conductive copper powder.

2. The antioxidant conductive thermal paste as claimed in claim 1, wherein the antioxidant conductive thermal paste contains 3-17 wt % the reactive monomer, 5-15 wt % the thermosetting resin, 0.5-4 wt % the polymerization inhibitor, 75-90 wt % the electrically conductive filler, and 0.1-3 wt % the thixotropic agent.

3. The antioxidant conductive thermal paste as claimed in claim 2, wherein a median particle diameter (D50) of the conductive copper powder is between 0.1-10 μm and a ratio of D90 to D50 of the conductive copper powder is less than 3.

4. The antioxidant conductive thermal paste as claimed in claim 1, wherein a median particle diameter (D50) of the conductive copper powder is between 0.1-10 μm and a ratio of D90 to D50 of the conductive copper powder is less than 3.

5. The antioxidant conductive thermal paste as claimed in claim 1, wherein the thixotropic agent is selected from the group consisting of polyamide wax, oxidized polyethylene wax, or combinations thereof.

\* \* \* \* \*